Sept. 9, 1958     D. L. BROWN     2,851,539
APPARATUS FOR REPRODUCING SOUND

Filed April 13, 1956     2 Sheets-Sheet 1

Delmar L. Brown     INVENTOR.

Sept. 9, 1958   D. L. BROWN   2,851,539
APPARATUS FOR REPRODUCING SOUND
Filed April 13, 1956   2 Sheets-Sheet 2

Delmar L. Brown INVENTOR.

United States Patent Office 2,851,539
Patented Sept. 9, 1958

2,851,539
APPARATUS FOR REPRODUCING SOUND
Delmar L. Brown, Portland, Oreg.
Application April 13, 1956, Serial No. 578,100
14 Claims. (Cl. 179—100.3)

This invention relates to a method, apparatus, and process for reproducing audible sound and control signals in a moving vehicle by means of a photo-electric scanning device on the vehicle, arranged to receive variations in reflected light from opaque sound tracks fixed on the surface of roadways or rails, and has for its principal object the provision of reproductions of the human voice, music and other audible sounds to vehicle drivers and passengers for the purpose of providing safety information, driving directions, entertainment, diversion and advertising. A further object is to provide audible indication of vehicle position on the roadway, in addition to providing control signals which may be used to actuate alarm devices or to actuate brakes, steering gear, or similar control mechanisms on the moving vehicle.

In the application of hitherto used means of reproducing useful or entertaining audible sounds for the passengers of moving vehicles, the transmission and reception of electromagnetic radio waves has been a common practice, but the audible messages thus transmitted and received are necessarily fixed as to time and cannot be scheduled to be heard by the vehicle passengers at the precise place or location where the audible messages would have their optimum usefulness or value in warning the passengers of danger or providing specific information about the characteristics of the locality.

By means of the application of the known art of sound reproduction as accomplished with a scanner, or reproducing head, in conjunction with a moving sound track on film or tape, and by reversing the usual relationship between the film and the scanner in such a manner that the scanner moves with a vehicle and the sound track remains stationary and fixed on a roadway, I have provided to vehicle passengers audible messages which are fixed as to locality.

It is well known that such a system of sound reproduction having a fixed sound track and a travelling scanner of conventional design will reproduce the originally recorded sound frequencies only when the velocity of the travelling scanner is the same as the relative velocity of motion between the sound track and the recording head which obtained during the making of the original sound track recording. In effect, this limited relationship would allow the practical reproduction of speech or music or other audible sounds in a travelling vehicle only when the velocity of the vehicle is very nearly the same as the predetermined velocity at which the sound track recording was made, and this condition would very greatly impair the practicability of the system, inasmuch as the velocity of the vehicle under the control of the operator must be varied in accordance with road and traffic conditions.

It is further known that, in the present state of the art of reproducing sound from sound tracks, any excessive lateral displacement between the recorded sound track and the scanning head will result in the loss or impairment of the audible sound signal, and that this limitation, if it could not be avoided in the application of the principle to my roadway sound track invention, would so limit the normal lateral movement of the vehicle during its travel as to cause the system to be impractical.

Also, it is known that in the present art of reproducing sound from sound tracks, imperfections such as foreign matter on the sound track, and splices in the sound track, will cause unwanted disturbances in the reproduced sound, and that a sound track laid on the surface of a roadway would be subject to similar and more troublesome imperfections in the form of dirt, rocks, oil spots, pavement surface roughness, pavement expansion-joint materials, and "screed lines" in the pavement surface. These imperfections would so greatly impair the reproduction of sound from a roadway sound track as to greatly limit its usefulness if the scanning apparatus were constructed in conformance with heretofore used principles.

Inasmuch as the contemplated use of my method of sound reproduction will often occur during the daylight hours when the shadows of trees and other objects falling across the roadway sound tracks would result in unwanted light variations within the field of the scanner, causing disturbances in the reproduced sound, I have provided a source of sound track illumination having, typically, a characteristic wavelength differing from the spectral wavelengths of sunlight, and this light source, when used with a scanner photoelectric cell having a matching spectral response, will minimize the effect of sunlight shadows.

A further advantage of the use of sound track illumination comprised of light wavelengths other than those in visible spectrum is that the fixed roadway sound tracks may then be formed of light absorbing and light reflecting or fluorescing materials which provide the required variations in light intensity to the photoelectric cell of the travelling scanner, but are essentially invisible to the human eye.

The operation of vehicles on modern roadways has become of such complexity that the use of signs for imparting information to vehicle drivers is inadequate, especially during periods of darkness, or reduced visibility, or high speeds of travel. Advertising signboards are likewise inadequate during reduced visibility, and may be so numerous as to be ineffective.

Another object of my invention is to overcome or minimize the effect of these deficiencies and imperfections to a degree which will allow the practical attainment of the reproduction of speech and other audible sounds, and control signals, in a moving vehicle from a fixed roadway sound track recording, and thereby permit the establishment of an hitherto unknown useful art.

The method of compensating the frequencies of the reproduced sound for the effects of variations in the forward velocity of the transporting vehicle, as used in my invention, causes the frequency of the sounds heard at the loudspeaker to be virtually identical to the frequency of the sounds originally recorded on the sound tracks. However, the reproduced sounds are lengthened in time of delivery when the vehicle travels at a velocity less than a predetermined "normal" velocity, and are shortened in time of delivery when the velocity of the vehicle is greater than the "normal" velocity. The term "normal" velocity, which will be referred to in this application, is any predetermined velocity at which a given sound track may be recorded, and, also, the same predetermined velocity when applied to the vehicle-transported reproducer travelling along the sound track and correctly reproducing the originally recorded frequencies without the use of any form of frequency corrector or compensator.

When human speech is reproduced by my scanning invention, the variations in time of delivery have the illusion of causing the speaker to talk slowly or rapidly if the velocity of the transporting vehicle is less or greater than the "normal" velocity, but I have determined that the voice characteristics of the speaker remain identifiable, and the intelligibility of the spoken message remains unimpaired, for all vehicle velocities between 0.3 "normal" and 2.5 "normal," approximately.

In the drawings which are a part of this application, I have depicted the several elements my invention which, when combined in the manner shown, comprise the basic apparatus and process which I have found best suited to perform the desired functions.

Figure 1:
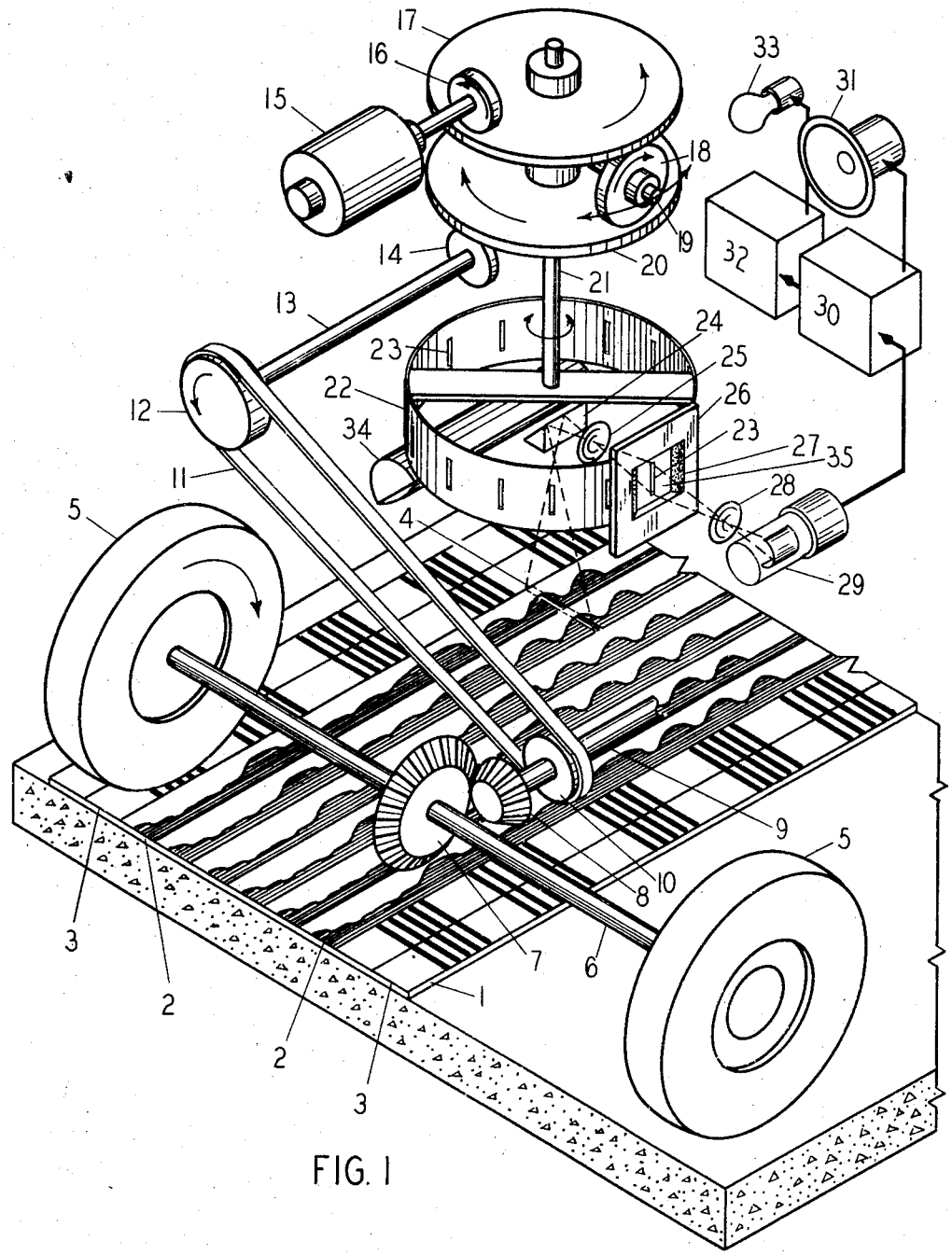
Fig. 1 is an isometric view of the combined elements of the scanning and sound reproducing device, shown in its relation to the fixed sound tracks on the roadway, and to its transporting vehicle.

In my illustration, Fig. 1, the scanning and sound reproducing device is shown mounted on a vehicle, represented by wheels 5, connecting axle 6, and drive shaft 9, which runs on the roadway, but construction of the vehicle and roadway are not claimed parts of my invention.

Figure 2:
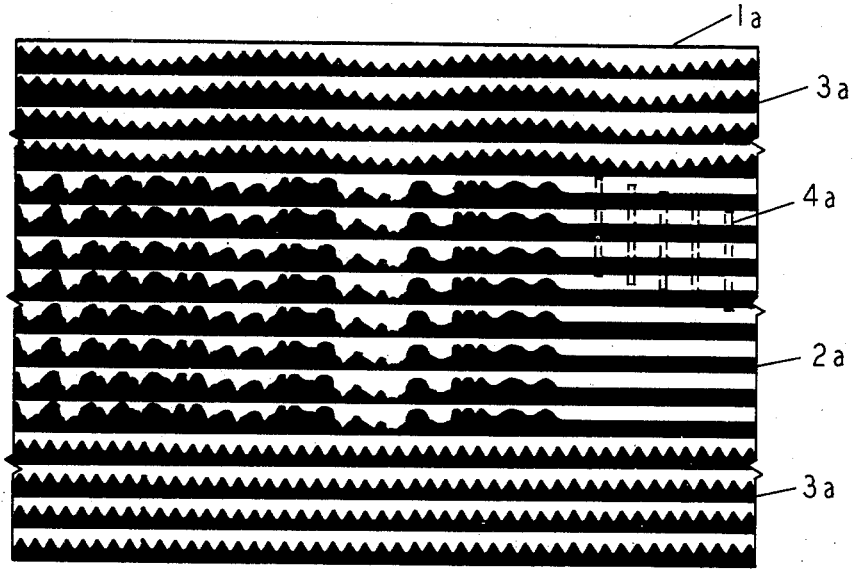
Fig. 2 is a plan view of a short section of an alternate form of roadway sound track pattern applied to a roadway surface.
Figure 3:
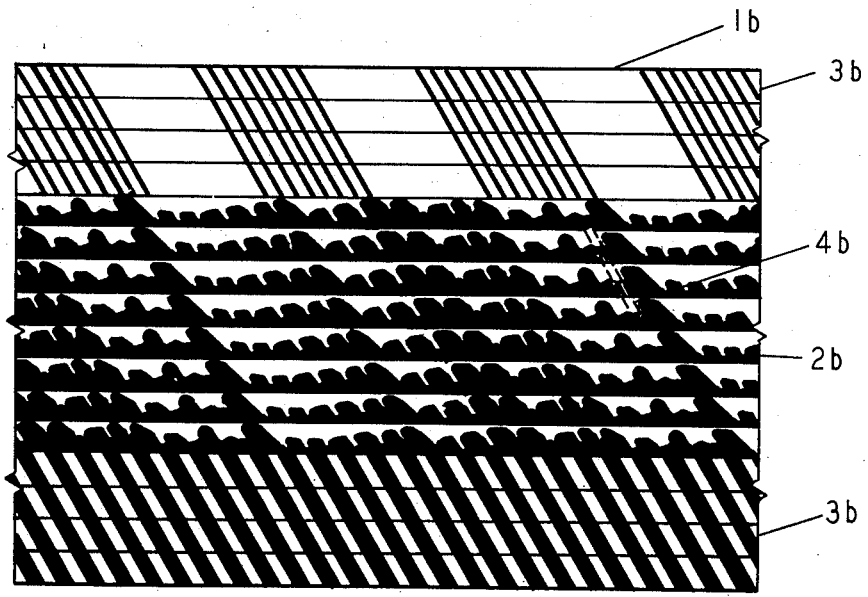
Fig. 3 is a plan view of a short section of another alternate form of roadway sound track pattern.

The fixed roadway sound tracks, which comprise an integral part of my invention, may be of the form shown in isometric view at 1 in Fig. 1, or of the form shown in plan views at 1a and 1b in Fig. 2 and Fig. 3 respectively. These sound tracks are composed, typically, of groups of identical sound track stripes 2, 2a, or 2b, which are typically recorded on opaque film, tape, paper, plastic sheet or similar substances, and are subsequently cemented to the roadway surface, or are directly recorded on the roadway by means of the controlled or modulated application of paints or coatings of differing light reflectivity.

The sound tracks 1 shown in Fig. 1, are composed of a central group of narrow sound track stripes 2, each of which may range from ¼ inch to 6 inches in width. The stripes are shown as variable-area single-side recordings, each stripe in the group being identical in recorded pattern, and designed to be scanned by a scanning slit area 4 having its greatest dimension at right angles to the direction of movement of the scanner. Flanking the central band of sound track stripes 2, on both sides, are parallel groups of sound track stripes 3, which, in this illustration, represent variable-density recordings of audible warning sounds, and in addition, may serve as fixed-frequency coded signal recordings which may be decoded by decoder 32 to actuate visual alarm signal light 33.

As an illustration of an alternate form of the sound tracks, Fig. 2 depicts a plan view of a short section of sound tracks 1a composed of a central group of sound track stripes 2a which have been recorded as variable-area single-side recordings, together with a distinctive group of variable-area single-side recordings 3a on each flank of the central group 2a. In Fig. 2, a series of instantaneously scanned areas 4a illustrate that, in my invention, the longest dimension of the scanning slit area 4a is designed to be equal to the sum of the transverse widths of any whole number of individual sound track stripes 2a less than the total number of identical stripes in a group, and that the scanning slit area 4a may then be moved laterally within the confines of the group of identical stripes without loss or impairment of the sound or signal reproduced from that group.

In another alternate form of roadway sound track shown in plan view, Fig. 3, the individual sound track stripes 2b and 3b are recorded and constructed with the transverse line of the recording, and scanning slit area 4b, at an angle less than 90 degrees, but typically greater than 45 degrees, referred to the direction of travel of the scanning slit area 4b. In this form of sound track pattern, imperfections in the sound tracks in the form of small spots occupy a smaller proportion of the scanning area 4b because of its greater length compared to the length of a scanning slit area placed at a right angle to the direction of scanner travel. Also, roadway construction imperfections which form lines at right angles to the longitudinal direction of the roadway are scanned by the oblique scanning area 4b in Fig. 3 in such a manner that the scanned image of the imperfection causes the reproduction of interfering sounds to be of such low frequency and low amplitude as to constitute a small portion of the sound being reproduced from the sound track recording.

In the embodiments of my invention shown, the sound tracks 1 and 1a and 1b have been photographically reproduced on sensitized silver-halide paper, and have been subsequently applied to the roadway surface with an adhesive, but my invention encompasses the use, additionally, of other photosensitive papers or films, or metallic foil, similarly cemented to the roadway, and the use of suitable pigments together with suitable vehicles or adhesives applied directly to the roadway surface, or, alternately, onto a paper, film or foil which has been either previously or subsequently applied to the surface of the roadway.

Materials providing the recorded pattern of the sound tracks 1, 1a and 1b are typically pigments in a suitable binder, which, in combination, either tend to absorb light or to reflect it. Although the terms "light" and "image" as used in my description have inferred that the "light" and the "image" are visible to the human eye, my invention encompasses the use of any of the electromagnetic radiations between the limits of 200 Angstrom units and 4,000,000 Angstrom units. Also, the terms "reflect" and "light reflection" as used in this application encompass the phenomenon known as fluorescence.

The roadway sound tracks are illuminated by light source 34, which characteristically emits electromagnetic radiations having wave lengths falling within the range of 200 to 4,000,000 Angstrom units. Light source 34 is mounted on the transporting vehicle in a manner which will uniformly illuminate the areas of sound track being scanned by the transported scanning apparatus at any given instant.

In a typical embodiment of my invention, the optical image of a sound track such as the sound track 1, is projected by means of prism 24 and lens 25 onto the internal surface of an opaque scanning wheel 22 having a plurality of equally spaced transparent scanning slits 23 in its periphery or rim. Portions of the image which represent a desired area 4 of the sound track to be scanned at a given instant, pass through the scanning slits 23; through the aperture 35 of limiting mask 26; through converging lens 28, and fall upon photo-electric cell 29.

Photo-electric cell 29 acts to convert the variations in light intensity reaching it from the sound tracks into variations in electrical current which, by means of electrical amplifier 30, causes audible sounds to be reproduced in loudspeaker 31, and causes control signals passing through decoder 32 to actuate devices such as an electrical relay to switch on light 33.

During forward motion of the transporting vehicle, as indicated by the clockwise motion of wheels 5, a linkage represented by gears 7 and 8, pulleys 10 and 12, belt 11, shaft 13 and friction wheel 14, transmits proportional rotary motion of wheels 5 to disk 20, which is one driver of differential follower wheel 18. Differential disk 20 rotates in a clockwise direction, as indicated. Another differential disk 17 is driven in a rotary direction counter to the rotation of disk 20, i. e., counterclockwise, as shown, by means of friction wheel 16 on constant speed motor 15, in such a manner that differential follower wheel 18 will rotate in a constantly clockwise direction.

Differential follower wheel 18 is connected by differential spider arm shaft 19 and shaft 21 to scanning wheel 22, to cause scanning wheel 22 to rotate in either direction, as shown, and at rotative speeds which are proportional to the algebraic sum of the rotative speeds of disk 17 and disk 20.

In Fig. 1, I have shown the driving and driven elements of the differential linked by means of a belt 11 and friction wheels 14 and 16, because these afford a smoother drive at a lower manufacturing cost than do toothed gears, and because the precise speed ratios of gears are not necessary to the proper functioning of my invention, but the invention encompasses the use of gearing, flexible shafting, selsyn motors, and other suitable means of transmitting rotary motion.

The ratio of the gears 7 and 8, together with pulleys 10 and 12 and friction wheel 14, disk 17 and follower wheel 18, is such that if friction wheel 16 is at a standstill and vehicle wheels 5 are traversing the roadway at any forward velocity, the ratio of the circumferential velocity of scanning slits 23 in scanning wheel 22 to the forward linear velocity of the vehicle is numerically equal to the ratio of optical image reduction achieved by prism 24 and lens 25 between the roadway sound track 1 and the optical plane of scanning slit 23 in scanning wheel 22.

Also, the ratio of friction wheel 16 and disk 17, together with differential follower wheel 18, is such that when vehicle wheels 5 and disk 20 are at a standstill and constant-speed motor 15 is rotating at its predetermined "normal" speed, the ratio of the circumferential velocity of scanning slits 23 in scanning wheel 22 to a predetermined "normal" linear scanning velocity for sound tracks 1 will be numerically equal to the optical image reduction achieved by prism 24 and lens 25 between the sound tracks 1 and the optical plane of scanning slit 23 in scanning wheel 22.

The ratio of the drives causing the rotation of disk 17 and disk 20 is further specified as such that when the vehicle wheels 5 are traversing the roadway at a forward linear velocity which is equal to the predetermined "normal" velocity at which sound tracks 1 are designed to be scanned, and if constant-speed motor 15 is rotating at its predetermined "normal" speed and indicated direction, the rotation of disks 17 and 20 will be equal in velocity but opposite in direction, with the result that spider arm shaft 19 and scanning wheel 22 will be at a standstill.

With the transporting vehicle in forward motion at any given velocity in excess of the predetermined "normal" recording velocity of the sound tracks 1, the rotation of differential disk 20, imparted to it by wheels 5 through the mechanism shown will be opposite in direction and exceed in velocity the motion imparted to differential disk 17 by constant speed motor 15 through friction wheel 16, and the resulting motion of scanning wheel 22 is such as to cause "reverse" (i. e. clockwise) rotation of the scanning wheel 22 at a velocity proportional to the excess of vehicle velocity over that of the "normal" velocity derived from controlled speed motor 15. This "reverse" rotation of scanning wheel 22 subtracts from the actual forward scanning velocity of the vehicle the scanning velocity in excess of the "normal" scanning velocity, causing the frequency of the light variations reaching photo-electric cell 29 from sound tracks 1 to be equal to the "normal" recorded frequency.

With the transporting vehicle in forward motion at exactly the "normal" recorded velocity of the sound tracks 1, the rotation imparted to differential disk 20 by wheels 5 will be equal in velocity but opposite in direction to the motion imparted to differential disk 17 by constant speed motor 15, causing differential spider shaft 19 and scanning wheel 22 to have no rotative motion and allowing the light variations from sound tracks 1 to be transmitted through a single stationary scanning slit 23, in turn causing the frequency of the light variations at photoelectric cell 29 to be equal to the "normal" recorded frequency rate.

With wheels 5 of the transporting vehicle at a standstill, scanning wheel 22 will be driven in a "forward" counterclockwise direction by constant speed motor 15, through friction wheel 16, disk 17 differential follower 18, and spider arm shaft 19, at a peripheral velocity proportional to the "normal" scanning velocity rate of the sound tracks 1, causing the frequency of light variations at photo-electric cell 29 to be equal to the "normal" recorded frequency of sound track 1.

In operation, when the forward velocity of the vehicle wheels 5 is in excess of the predetermined "normal" velocity at which sound tracks 1 are designed to be scanned, the differentially driven scanning wheel 22 and the limiting aperture 35 in optical mask 26 act to provide at the loudspeaker 31 a uniformly constant sound frequency when reproduced from a constant wavelength sound track, at all forward velocities of the transporting vehicle, by a process in which desired and accepted linear bits or samples of the optical image of sound track 1 being viewed by the optical system 24, 25 are caused to be scanned by scanning wheel 22 at a constant linear velocity, while certain other bits or samples of the sound track 1 are not optically transmitted to photoelectric cell 29 and are therefore not reproduced as a part of the electrical signal supplied to the loudspeaker 31.

Conversely, when the velocity of the transported scanner carried by the vehicle is any given velocity less than the predetermined "normal" velocity at which sound tracks 1 were designed to be scanned, the differentially driven scanning wheel 22 and the aperture 35 in limiting mask 26 act to provide at loudspeaker 31 a uniformly constant sound frequency from a constant wavelength sound track, at all velocities of the transporting vehicle between the limits of the predetermined "normal" velocity and zero, by a process of additive sampling in which selected linear samples of the optical image of sound tracks 1 are scanned repetitively, and each repetitively scanned sample is joined to the previously scanned sample in a continuous time sequence. The result is that the rate of scanning provided by the differentially driven scanning wheel is added algebraically to the rate of scanning provided by movement of the vehicle so as to produce a substantially constant scanning rate for forward velocities of the vehicle.

In my invention, the aperture 35 of limiting mask 26 is such that its effective transverse width, in the direction of movement of scanning slits 23, is equal to the effective distance between adjacent scanning slits 23 in wheel 22, in a manner which will cut off the image of one slit at the instant that the image of the next succeeding slit is allowed to pass through the aperture 35, and, by this means, join each succeeding image traverse across the aperture 35 in a continuous time succession.

To avoid the abrupt cessation of one slit image traverse and the abrupt beginning of the next, which tend to cause an unwanted audible fluttering in the sound reproduced at loudspeaker 31, my invention encompasses the use, optionally, of zones of varying optical density 27 at the entrance and exit edges of aperture 35 in mask 26, with each of these zones of varying optical density occupying, typically, a transverse width in the direction of scanning image travel, of one one-thousandth to one twentieth of the distance between scanning slits 23 in scanning wheel 22.

By means of these zones of varying optical density 27, each moving scanning slit image or beam is uniformly attenuated at as it traverses the limits of aperture 35, and each succeeding scanning slit image or beam is concurrently accentuated as it enters the limits of aperture 35, with the result that each succeeding scanned sample of sound tracks 1 is in effect smoothly joined to the preceding sample by overlapping in a time sequence, thus reducing both the effective frequency and the amplitude of unwanted fluttering noise.

The vertical height of the optical image passing through the scanning slits 23, which represents the transverse width of the scanned area 4, is limited by means of the optical slits 23 to any whole number of individual sound track stripes 2. When scanning a whole number of identical sound track stripes 2, the optical image passing through slits 23 and falling upon photo-electric cell 29 will contain a given ratio of light-image area to dark-image area, and this ratio remains constant for various lateral positions of the scanner prism 24 with respect to the identical sound track stripes 2 which are typically of the types known as variable-density, variable-area single-side, or variable-area double side. The constancy of the light-image to dark-image ratio during lateral movement is shown by the several successive lateral positions of instantaneously scanned areas 4a in Fig. 2, in each of which the ratio of dark-image area to light-image area is found to be identical. In my invention, it is the constancy of the ratio of light-image area to dark-image area during lateral movement of the scanner transporting vehicle on the roadway which permits the reproduction of sound from the roadway sound track which is not varied or distorted by the lateral movement of the transporting vehicle, except in the event that the lateral limits of the scanned area 4 extend beyond the limits of a group of identical sound track stripes 2 in which case a warning signal of substantially constant frequency is produced by the sound track stripe 3.

What I claim is:

1. A system for the reproduction of signals in a moving vehicle comprising a light reflecting sound track fixed on the surface of a stationary roadway, and a photo-electric scanning device mounted on said vehicle, said scanning device having means of converting light of varying intensity reflected from the sound track into electrical current variations.

2. Apparatus for the reproduction of sound in moving vehicles from a plurality of light reflecting sound tracks fixed on the surface of a roadway, said apparatus comprising a source of light on said vehicle for projecting light having wave lengths falling within the range of 200 to 4,000,000 Angstrom units upon at least a portion of said sound tracks, and a scanning device on said vehicle having an optical system for projecting upon a photo-electric cell the variations in light reflected from the fixed sound tracks.

3. Apparatus for the reproduction of signals in a moving vehicle comprising of at least one light reflecting sound track fixed on the surface of a roadway, in combination with a photo-electric cell on said vehicle and a source of light on said vehicle for illuminating the sound track with light and a scanning apparatus on said vehicle including an optical system for producing scanning images having rates of scanning which, when added algebraically to the rate of scanning resulting from the forward rate of travel of the vehicle provide resultant scanning images having a net linear rate of scanning which is substantially constant for forward velocities of the moving vehicle, said optical system having means for algebraically adding said rates of scanning and projecting the resultant images upon said photo-electric cell.

4. Apparatus for the reproduction of fixed-frequency control signals in a moving vehicle, comprising a plurality of light reflecting signal tracks fixed on the surface of a roadway, in combination with a photoelectric cell on said vehicle and a source of light on said vehicle for illuminating the signal tracks with light having wave lengths falling within the range of 200 to 4,000,000 Angstrom units, and a scanning device on said vehicle including an optical system for producing scanning images having rates of scanning which when algebraically added to the rate of scanning resulting from the forward rate of travel of the vehicle provide resultant scanning images having a substantially unvarying frequency for forward velocities of the moving vehicle, said optical system having means for algebraically adding said rates of scanning and projecting the resulting image on said photo-electric cell.

5. A roadway sound and control signal track positioned on the surface of a roadway comprising a plurality of individual light reflecting sound tracks, having widths varying from ¼ inch to 6 inches positioned parallel to each other and extending longitudinally of the direction of vehicle travel to form a broad band of individual sound tracks on the roadway surface enabling a sound track scanner having a lateral width of view less than the lateral width of the broad band of sound tracks to move laterally within the limits of the broad band of tracks without effective change in the image within the lateral width of view of the scanning device.

6. A roadway sound and control signal track positioned on the surface of a roadway, comprising a plurality of individual light reflecting sound tracks, each having a width varying from ¼ inch to 6 inches and positioned parallel to each other and extending longitudinally of the direction of vehicle travel on said roadway, the individual sound tracks in the central area of the broad band forming a central band of tracks carrying the principal intelligence, and the central band of tracks being flanked on each side by separate and distinct bands of control tracks carrying auxiliary intelligence indicating that the vehicle has veered laterally beyond the limits of the central band of sound tracks.

7. A light reflecting roadway sound track for employment with a movable scanning apparatus having a scanning slit at a fixed angle other than 90 degrees to the direction of the scanning apparatus, said sound track having recorded variations at said angle so as to reduce the effective amplitude of any sound track imperfections having a line of direction at a right angle to the direction of travel of the scanning apparatus.

8. In a movable scanner for the reproduction of sound from fixed sound tracks, apparatus for providing an essentially constant rate of scanning at varying velocities of movement of said scanner relative to said sound tracks, including a rotatable power driven optical scanning member, in combination with a differential device for rotating said member, to produce scanning images having rates of scanning which when added algebraically to the rate of travel of the scanner relative to the sound track will cause the resultant net rate of scanning to be substantially constant.

9. In a movable scanner for the reproduction of sounds and signals from light reflecting sound tracks fixed on the surface of a roadway, apparatus for compensating for frequency variations caused by variations in the velocity of the moving scanner relative to the said sound tracks including a rotatable scanning wheel having in its periphery a plurality of optical scanning slits and a differential device for rotating said wheel, said differential device having a member driven in proportion to the velocity of the moving scanner, and another member driven from a constant speed motor to cause the net linear velocity of scanning of the fixed sound tracks to be substantially constant.

10. In a scanner for mounting on a moving vehicle for the reproduction of sound from fixed sound tracks, means for compensating for frequency variations caused by variations in the velocity of said vehicle including a rotatable scanning wheel having in its rim a plurality of optical scanning slits, and means for driving said wheel in directions and at velocities which will cause the net linear velocity of scanning of the sound tracks to be substantially constant for all forward velocities of said vehicle, said scanner having a photo-electric cell upon which images of said sound track are projected and a limiting aperture causing the images projected upon said cell at any given instant to pass through not less than one nor more than two of the optical scanning slits so as to cause the sequential travel of scanning slit images through said limiting aperture to be joined in a continuous time sequence.

11. In a movable scanner for the reproduction of sound from fixed sound tracks, means for compensating for frequency variations caused by variations in the velocity of the moving scanner including a rotatable scanning wheel having in its periphery a plurality of optical scanning slits, said scanner having a limiting optical aperture with a width parallel to the direction of scanning causing the image of not less than one nor more than two of the scanning slits to simultaneously pass through the limiting optical aperture, and having at the leading and trailing edges of this aperture zones of varying optical density ranging from transparency to opacity to provide a moving optical image projected through a scanning slit and through the optical aperture which is uniformly increased in intensity as it enters the aperture, and to be uniformly decreased in intensity as it leaves the aperture so as to cause each succeeding moving image entering the aperture to be accentuated concurrently with the attenuation of the prior moving image as it leaves the aperture, whereby images of successively scanned sequences of a sound track are smoothly joined in time sequence.

12. In combination, a fixed sound track including a plurality of similar parallel sound track stripes, a movable scanner for the reproduction of sound from said fixed sound track, said scanner having a photo-electric cell and means providing for lateral movement of the scanner with respect to the sound tracks without resultant impairment of the optical image falling upon said photo-electric cell including an optical aperture having a width of opening in a direction transverse to the direction of travel of the scanner such that the width of the sound track image passing through the aperture and falling upon such photo-electric cell is equal to the transverse widths of the sum of any whole number of individual identical sound track stripes less than the total number of said sound stripes in said track.

13. In a movable scanner for the reproduction of signals from fixed light reflecting sound tracks, an optical scanning system having apparatus for diminishing the effect of unwanted light variations in said optical scanning system, including a source of sound track illumination having a fixed range of spectral emission outside the general spectral range of the unwanted light in combination with a photo-electric light-sensitive receiving cell having a greater response to the range of spectral emission of the source of sound track illumination than to the general spectral range of the unwanted light.

14. Apparatus for the actuation of an electrical device in a moving vehicle, comprising at least one constant wavelength light reflecting signal track fixed on the surface of a roadway, in combination with a photo-electric scanning device on said vehicle including an optical system for producing scanning images having rates of scanning which when algebraically added to the rate of travel resulting from the forward rate of travel of the vehicle provide a resultant scanning image having a substantially unvarying frequency for forward velocities of the moving vehicle, a photo-electric cell positioned to have said unvarying frequency image fall thereon to thereby produce an electrical current of unvarying frequency, and means for delivering said electrical current to said device to cause actuation of said device responsive only to said unvarying frequency.

References Cited in the file of this patent

UNITED STATES PATENTS

| | | |
|---|---|---|
| 1,490,253 | Blosky | Apr. 15, 1924 |
| 2,576,424 | Sunstein | Nov. 27, 1951 |